C. F. POLACK.
ATTACHMENT FOR AUTOMOBILES.
APPLICATION FILED MAR. 29, 1917.
1,252,943.
Patented Jan. 8, 1918.
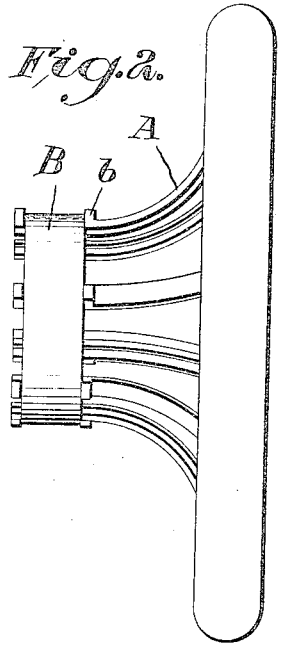
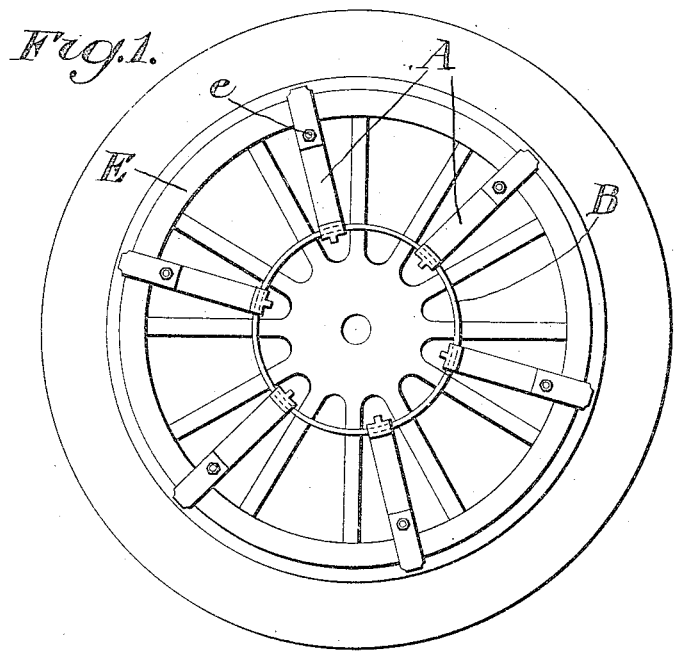
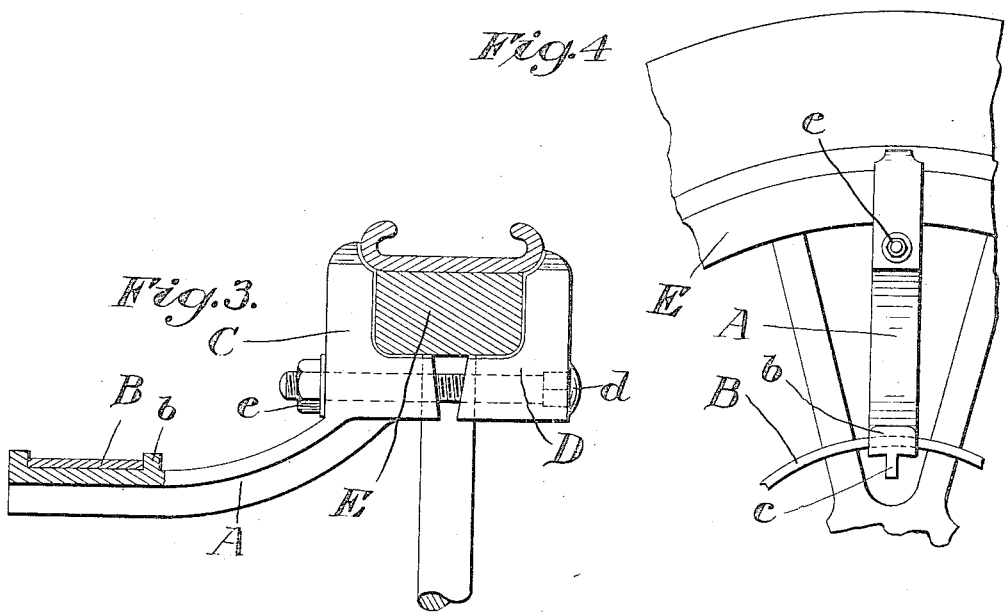
Inventor:
Charles F. Polack,
by Spear, Middleton, Donaldson & Spear
Atty's.

UNITED STATES PATENT OFFICE.

CHARLES F. POLACK, OF YORK, PENNSYLVANIA.

ATTACHMENT FOR AUTOMOBILES.

1,252,943.  Specification of Letters Patent.  Patented Jan. 8, 1918.

Application filed March 29, 1917. Serial No. 158,328.

*To all whom it may concern:*

Be it known that I, CHARLES F. POLACK, of York, Pennsylvania, a citizen of the United States, have invented certain new and useful Improvements in Attachments for Automobiles, of which the following is a specification.

My invention is designed to utilize the driving wheel of an automobile when the automobile is not in use, as a source of power for the multitudinous uses to which such power device may be applied, particularly on a farm.

I am aware that broadly it has been heretofore known to utilize this power, but I have aimed to make such a simple construction as to reduce the cost so as to put my improved device within the reach of every one and to also produce a device which may be easily applied and detached. I have also aimed in devising my improved structure to prevent the abrasion of the parts of the automobile to which the device is applied without lessening the security of the attachment.

In the accompanying drawing:

Figure 1 is a front elevation showing my attachment in place on an automobile wheel;

Fig. 2 is a side elevation;

Fig. 3 is an enlarged sectional detail, and

Fig. 4 is an enlarged fragmentary elevation.

It will of course be understood that my device may be attached to any form of automobile wheel and while I have shown it in connection with a wooden wheel the structure may be changed to utilize it in connection with a wire wheel without departing from the spirit of my invention.

My purpose is to make the attachment as light as possible and to this end instead of having a heavy pulley wheel to receive the driving band I connect the ends of the arms or brackets A with a steel band B secured to the arms in any suitable manner, and this band constitutes the bearing surface for the driving band, projections b, b, being cast on the arms A to hold the driving band in place. The arms or brackets A are made of T-metal so as to provide strength without undue weight, as shown at c, Fig. 4, and preferably I use six of these brackets though more or less may be used as the demands of the work may require. A smaller number may be used where the work is light, and while a larger number may be used it is believed that six will be found ample however heavy the work.

The inner ends of the brackets have a right angular tension as shown at C, and a block D practically duplicating the end of the bracket C forms with the end C the means for securing the attachment to the automobile rim and felly. A bolt d, passes through an opening in the block D having a squared shoulder engaging a corresponding recess in said block so that it is prevented from turning, and its opposite threaded end passes through the part C, this threaded end being provided with a nut and washer as shown at e. The inner faces of the part C and D I preferably line with canvas or some such material to prevent the abrasion of the surface gripped by these parts. I also groove the upper inner ends of the parts C and D so that they will fit snugly around the corners of the rim and tend to strengthen and sustain the connection. As I make the block D and bolt independent it will be seen that either the block or the bolt may be replaced if one or the other becomes damaged. I make the bolt long enough so that the block D may always be retained on the bolt and the bolt kept in connection with the part C so as to prevent displacement of the parts of the attachment. The clamping sections C and D are widened to fit over the felly E and are forced upwardly until they are snugly in contact with the metal rim, after which the nut e is tightened up and the device is ready for use.

In case the attachment is to be used on a wire wheel the clamping sections C and D are changed accordingly and are made shallower and given a configuration which will accommodate itself to the shape of the rim.

What I claim is:

1. An attachment for automobiles consisting of a series of arms or brackets provided with angular inner extensions constituting gripping faces for one side of the wheel rim, belt driving means secured to the outer ends of said arms or brackets, and a series of gripping blocks for the opposite side of the wheel rim coacting with the gripping faces of the arms with bolts and nuts for drawing the faces together and serving as supports between the brackets and the gripping blocks, substantially as described.

2. An attachment for automobiles comprising a series of arms adapted to be gripped to the rim of an automobile wheel, and a metal band encircling the outer end of said arms, substantially as described.

3. An attachment for automobiles comprising a series of arms T-shaped in cross section, a band connecting the outer ends of these arms, the inner ends of the arms having an angular configuration, and blocks having a like configuration or face supported from the extensions by bolts, substantially as described.

4. An attachment for automobiles comprising a series of arms, a band connecting the outer ends of said arms and means carried by the inner ends of said arms for attachment to the rim of an automobile wheel, comprising locking sections C and D with bolts for securing them together, said sections being adapted to engage the side walls of the felly of the wheel, and having recessed extensions engaging the rim, substantially as described.

In testimony whereof I affix my signature.

CHARLES F. POLACK.

Copies of this patent may be obtained for five cents each, by addressing the "Commissioner of Patents, Washington, D. C."